United States Patent
Stoia (10) Patent No.: US 11,727,097 B2
(45) Date of Patent: Aug. 15, 2023

(54) DUAL FINGERPRINT SENSOR CREDENTIALING

(71) Applicant: Infineon Technologies AG, Neubiberg (DE)

(72) Inventor: Valentin Stoia, Bucharest (RO)

(73) Assignee: Infineon Technologies AG, Neubiberg (DE)

( * ) Notice: Subject to any disclaimer, the term of this patent is extended or adjusted under 35 U.S.C. 154(b) by 263 days.

(21) Appl. No.: 16/884,337

(22) Filed: May 27, 2020

(65) Prior Publication Data

US 2020/0380102 A1 Dec. 3, 2020

(30) Foreign Application Priority Data

May 28, 2019 (DE) .......................... 102019114317.9

(51) Int. Cl.
*G06F 21/32* (2013.01)
*G06F 21/35* (2013.01)
*G06Q 20/34* (2012.01)
*G06Q 20/40* (2012.01)

(52) U.S. Cl.
CPC .............. *G06F 21/32* (2013.01); *G06F 21/35* (2013.01); *G06Q 20/3415* (2013.01); *G06Q 20/40145* (2013.01)

(58) Field of Classification Search
CPC ..... G06F 21/32; G06F 21/35; G06Q 20/3415; G06Q 20/40145; G07F 7/0833
See application file for complete search history.

(56) References Cited

U.S. PATENT DOCUMENTS

| 6,997,381 B2* | 2/2006 | Arnouse ................ G06K 7/006 235/382 |
| 2005/0139656 A1 | 6/2005 | Arnouse |
| 2010/0071031 A1* | 3/2010 | Carter ..................... G06F 21/32 726/2 |
| 2015/0379255 A1 | 12/2015 | Konanur et al. |
| 2016/0253651 A1* | 9/2016 | Park ..................... G06Q 20/322 705/39 |

OTHER PUBLICATIONS

RS 20150458A1 "Method of Biometric Identification of Newborn Babies"—Lalović, Komlen Jul. 9, 2015 (Year: 2015).*
"Incorporating Biometrics and Smart Cards"—Sandeep Anand, Dept. of Computer Science, University of Auckland, Apr. 2003 https://www.cs.auckland.ac.nz/courses/compsci725s2c/archive/termpapers/725anand.pdf (Year: 2003).*

(Continued)

*Primary Examiner* — Randy A Scott
(74) *Attorney, Agent, or Firm* — Banner & Witcoff Ltd.

(57) ABSTRACT

A credential authorization device having a first fingerprint sensor, configured to detect first sensor data representing one or more elements of a finger from a first person in contact with the first fingerprint sensor; a second fingerprint sensor, configured to detect second sensor data representing one or more elements of a finger from a second person in contact with the second fingerprint sensor; and one or more processors, configured to determine an authorization for a transaction based on an authentication of the first sensor data and the second sensor data.

19 Claims, 3 Drawing Sheets

---

Receiving first sensor data representing one or more elements of a finger from a first person in contact with a first fingerprint sensor 502

Receiving second sensor data representing one or more elements of a finger from a second person in contact with a second fingerprint sensor 504

Determining an authorization for an transaction based on an authentication of the first sensor data and the second sensor data 506.

(56) References Cited

OTHER PUBLICATIONS

"Smart Cards and Biometrics: A Smart Card Alliance and Physical Access Council White Paper"—Smart Card Alliance, Mar. 2011 https://www.securetechalliance.org/resources/pdf/Smart_Cards_and_Biometrics_030111.pdf (Year: 2011).*
S. Anand, "Incorporating Biometrics and Smart Cards", Department of Computer Science University of Auckland, 9 pgs., 2003.
German Patent office, Office Action issued for DE 102019114317.9, 7 pgs., dated: Jan. 24, 2020.

* cited by examiner

DUAL FINGERPRINT SENSOR CREDENTIALING

TECHNICAL FIELD

Various embodiments relate generally to the storing or replacement of authorization credentials using biometric data, i.e. fingerprints, and/or satisfaction of a biometric owner presence test.

BACKGROUND

Various devices utilize one or more methods of fingerprint verification to satisfy a biometric owner presence check. The verification of identity via a fingerprint may be associated with various additional functions, such as, for example, payment credentials, access credentials, or otherwise. In the event that it becomes desirable to transfer such credentials to an additional person, or simply to add an additional person's credentials to use the device, the current methods for transfer or addition of user credentials may be cumbersome and/or insecure.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which.

DESCRIPTION

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The word "exemplary" is used herein to mean "serving as an example, instance, or illustration." Any embodiment or design described herein as "exemplary" is not necessarily to be construed as preferred or advantageous over other embodiments or designs.

Throughout the drawings, it should be noted that like reference numbers are used to depict the same or similar elements, features, and structures.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one" of with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The term "processor" or "controller" as, for example, used herein may be understood as any kind of entity that allows handling data, signals, etc. The data, signals, etc. may be handled according to one or more specific functions executed by the one or more processors or controller.

One or more processors or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as one or more processors, controller, or logic circuit. It is understood that any two (or more) of the one or more processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "system" (e.g., a drive system, a position detection system, etc.) detailed herein may be understood as a set of interacting elements, the elements may be, by way of example and not of limitation, one or more mechanical components, one or more electrical components, one or more instructions (e.g., encoded in storage media), one or more controllers, etc.

A "circuit" as user herein is understood as any kind of logic-implementing entity, which may include special-purpose hardware or one or more processors executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

Throughout this disclosure, the words "finger" and "fingerprint" are used. It is understood that in various linguistic and cultural contexts, there may be a greater or lesser distinction between a finger and a thumb. Said contexts notwithstanding, however, the use of the word "finger" in this disclosure is expressly intended to refer to any digit of the hand, including any of the four fingers and/or the thumb. Furthermore, it is also recognized that some languages may refer to fingers in terms of numbered digits (first finger, second finger, etc.), rather than by names (index finger, middle finger, ring finger, and pinky finger). To the extent that an ordinal number appears herein in close relation to finger, said ordinal is not intended to refer to a specific digit of the hand. Again, it is anticipated that the methods and principles described herein can be performed using any of the five digits.

Various devices utilize one or more methods of fingerprint verification to satisfy a biometric owner presence check. The verification of identity via a fingerprint may be associated with various additional functions, such as, for example, payment credentials, access credentials, or otherwise. These identify verification functions can be performed on a wide variety of devices, including, but not limited to, identity cards or smart cards, keys, key fobs, or otherwise.

A smart card may be an integrated circuit card that functions as a physical electronic authorization device, which may be used to control access to a resource. Although smart cards may come in any form, and be made of any materials, many smart cards are made of plastic and include an embedded integrated circuit. Smartcards may be configured as contact smart cards or contactless smart cards. A contact smart card may include one or more electric contacts, which may be configured as an interface to connect the smartcard to one or more devices, such as a reader device. A contactless smartcard may include one or more antennas configured for inductive or capacitive coupling to a device, such as a reader device. Such inductive or capacitive coupling may provide a means through which data is transferred and/or a means to power the smartcard.

A smartcard may, but need not, be configured according to ISO 7810 and/or ISO 7816, which define the physical shape and characteristics of the smartcard, the electrical connector positions and shapes, electrical characteristics, communication protocols, and the basic functionality of the cards.

Broadly stated, smart cards may be configured to perform a physical verification function and a digital credential function. The physical verification function may be any function that is designed to satisfy the biometric owner presence check. That is, one or more sensors may be used to verify that a Person Associated with the card as an owner or user is physically present with the card. Although there are many methods of satisfying the biometric owner presence check, this description relates primarily to the use of one or more fingerprints to satisfy the biometric owner presence check.

In order to satisfy the biometric owner presence check via fingerprints, smart cards may conventionally be configured with a fingerprint sensor and a memory to store fingerprint data. When a fingerprint is detected by the sensor, the corresponding fingerprint information can be compared to the stored fingerprint data of an authorized user to verify an authorized user's identity. Because the verified identity is based on a fingerprint, it can generally be assumed that the owner's finger was in close proximity to the card. Thus, the biometric owner presence check is satisfied. This process satisfies the physical verification function of the card.

The card may also be configured to perform a digital credential function. This may include the transmission of information representing an authorization. The authorization may be any authorization whatsoever, including, but not limited to, authorization to enter a restricted physical area, authorization to enter a restricted digital area, authorization to operate equipment, authorization to carry out an electronic transaction, authorization to carry out a financial transaction, or otherwise. For example, it is known to have a smart card which is linked to one or more payment accounts, and which also utilizes a fingerprint sensor to satisfy a biometric owner presence check as a precondition to performing a payment transaction. Satisfactory verification of identity may permit performance of the digitally credentialing function.

Under certain circumstances, it may be desirable to associate the credentials of a third party with the card, such that the third party is granted access to the card's functions via a fingerprint authorization of the third party.

That is, a new fingerprint or set of fingerprints corresponding to a third person should be associated with the card such that the third person may satisfy the biometric owner presence check. This may be performed in a wide variety of implementations. One such situation may include when an authorized user of a payment account desires to give the account to another person, or to deputize another person to use the account. This may include, for example, the purchase of a gift card or other card associated with monetary value. If the card is not protected, such as by requiring a biometric owner presence check, it becomes vulnerable to theft or misuse. If, however, the card requires a biometric owner presence check, such as with a fingerprint, it becomes difficult for another person to use the card. One a practical level, this may prevent spouses and friends from being granted use privileges for a card. It also creates a barrier to resale of such cards due to the difficult of transferring biometric owner data.

It is proposed to include a plurality of fingerprint sensors within a smart card, to permit simplified transfer of biometric owner data. In this manner, the at least two fingerprint sensors may be used to obtain fingerprint information of a current biometric owner and a prospective biometric owner. The fingers of the current biometric owner and the prospective biometric owner may be applied to the card according to a fingerprint reassignment protocol. According to one aspect of the disclosure, the fingerprint reassignment protocol may include the fingerprints of the current biometric owner and the prospective biometric owner being applied simultaneously or currently to the fingerprint sensors. The fingerprint of the current biometric owner is verified and, upon verification of the current biometric owner's presence, the fingerprint or a profile representing the fingerprint of the prospective biometric owner is stored in a memory of the card.

Figure 1:
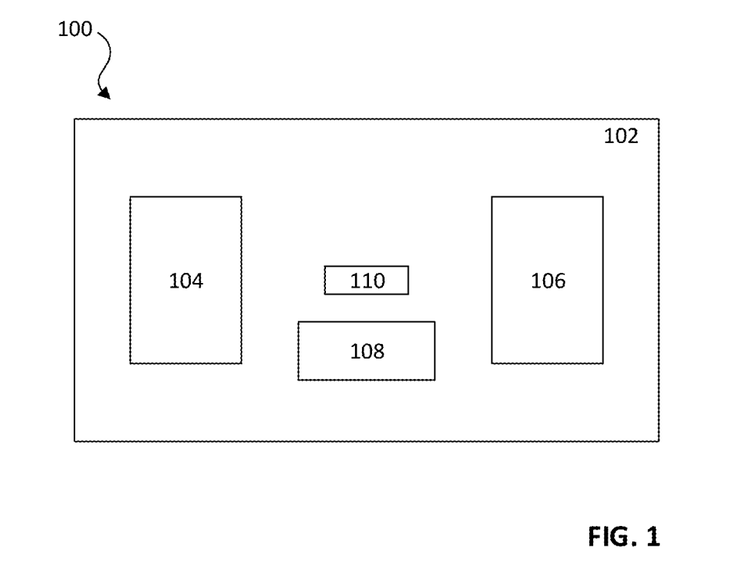
FIG. 1 depicts a credential authorization device, according to one aspect of the disclosure.

FIG. 1 shows a credential authorization device 100, according to an aspect of the disclosure. The credential authorization device 100 may include a housing or carrier 102. On or in the housing or carrier 102 may be a first fingerprint sensor 104 and a second fingerprint sensor 106. The credential authorization device may be configured with an indicator 108, which is configured to communicate an indication of successful credential transfer.

Assuming the presence of the current biometric owner, and in the event that the current biometric owner desires to transfer credentials to a prospective biometric owner, the following procedure may be carried out. The current biometric owner may place a finger on a first fingerprint sensor 104. The prospective biometric owner may place a finger on the second thing about sensor 106. The placement of the fingers on the sensors may be simultaneous or concurrent. Sensor one 104 detects fingerprint data and transfers the detected fingerprint data to the one or more processors 108, where the fingerprint data is compared to stored fingerprint data associated with the current biometric owner. Based on a comparison of the detected fingerprint data to the stored fingerprint data, it is determined whether the fingerprint on the first sensor 104 corresponds to the current biometric owner. This process may be achieved using any known method, and a person skilled in the art will appreciate the available methods of carrying out fingerprint authorization.

Assuming authentication of the current biometric owner, detected fingerprint information from the second fingerprint sensor 106 corresponding to the prospective biometric owner is transferred to the one or more processors 108, where it is processed and stored. The stored fingerprint data may be stored according to any standard or protocol. The stored fingerprint data corresponding to the prospective biometric owner is credentialed to grant rights and/or authorization to the prospective biometric owner. According to one aspect of the disclosure, the credentials of the prospective biometric owner may replace the credentials of the current biometric owner, thereby making the prospective biometric owner the current biometric owner. According to another aspect of the disclosure, the credentials of the prospective biometric owner may be stored in addition to the credentials of the current biometric owner. As such, and according to this implementation, both the current biometric owner and the prospective biometric owner would be verified to utilize the digital credential function of the smartcard and/or the credential authorization device. An indicator 110 may indicate successful storage and transfer of credentials. The indicator may be in any form whatsoever, and may provide an audio indication of credential transfer, a visual indication of credential transfer, a haptic feedback of a credential transfer, or otherwise.

Figure 2:
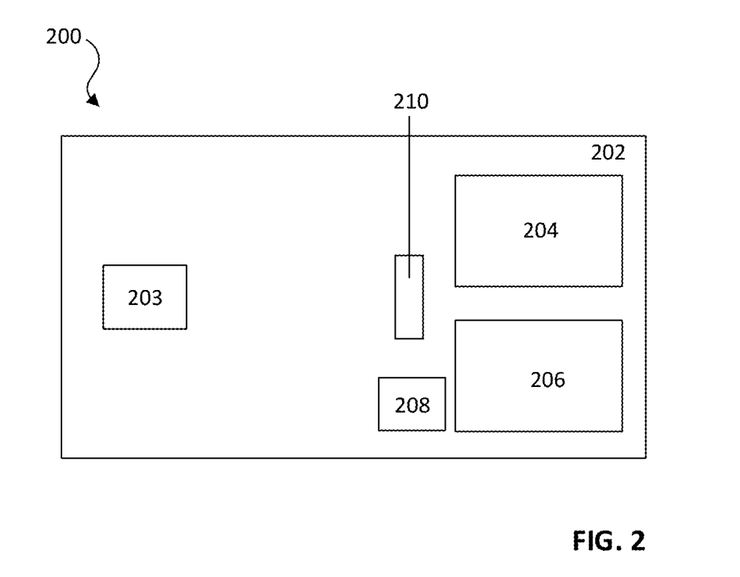
FIG. 2 depicts a credential authorization device configured as a smart card, according to an aspect of the disclosure.

FIG. 2 depicts an implementation of the credential authorization device 200 configured as a contact smartcard. According to this configuration, the credential authorization device includes a housing or substrate 202, a contact region 203, a first fingerprint sensor 204, a second fingerprint sensor 206, one or more processors 208, and an indicator 210. The one or more processors of the contact card must generally be powered, and the powering of the one or more processors may be achieved through a variety of means. One such means of powering the one or more processors is through use of one or more contacts. Electrical contacts may be implemented in the credential authorization device, such that the electrical contacts may function as an interface to connect to a reader or other powering source.

One known method of powering a processor and/or sensors on a credential authorization device is through the use of electrical contacts. Many smart cards, for example, include a contact region with one or more electrical contacts, which are inserted into or otherwise connected to a reader. The reader may utilize the electrical contacts to receive information from the smartcard, transfer information to the smartcard, and/or power the smartcard.

In this case, the contact region 203 may contain one or more electrical contacts, which may be configured to receive data from a reader, transfer data to a reader, and/or receive electrical current from a reader for powering the credential authorization device processor, sensors, or otherwise. In the event that the one or more contacts 203 are used to power the one or more processors of the credential authorization device, the fingerprint sensors 204 and 206 may optionally be placed opposite the contact region 203, or otherwise with a significant distance from the contact region 203 such that the card may be inserted into a reader to power the one or more processors through the contact region 203, while simultaneously granting physical access to the first fingerprint sensor 204, and the second fingerprint sensor 206. As stated above, the current biometric owner places a finger on the first fingerprint sensor 204 and the prospective biometric owner places a finger on the second fingerprint sensor 206, whether simultaneously or concurrently to the finger of the current biometric owner being placed on the first sensor 204. Assuming verification of the fingerprint corresponding to the current biometric owner 204, the fingerprint data associated with the prospective biometric owner is received in the second fingerprint sensor 206, processed within the one or more processors 208 according to one or more fingerprint data analysis or storage protocols, and credentials are associated with the fingerprint data corresponding to the prospective biometric owner. The indicator 210 indicates successful credential transfer.

Figure 3:
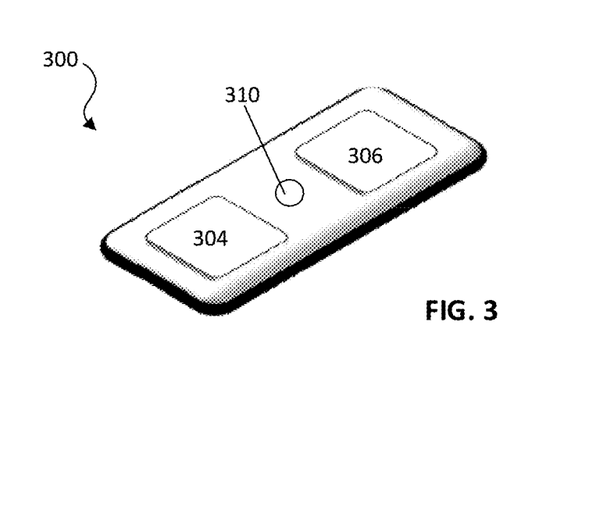
FIG. 3 depicts a credential authorization device configured as a key or key fob, according to another aspect of the disclosure.

FIG. 3 depicts a credential authorization device 300 configured as a key or a key fob, according to an aspect of the disclosure. Many devices rely on a contactless key or key fob to grant access or authenticate use. These may include doors, gates, motor vehicles, safes, or otherwise. These keys or key fobs may be configured as described herein to easily authenticate and authorize a prospective biometric owner to gain access to the door, gate, motor vehicle, safe, or otherwise. In this manner, the key or key fob is configured with a first fingerprint sensor 304, a second fingerprint sensor 306, one or more processors (not shown), and indicator 310. As stated above, the current biometric owner places a finger on the first fingerprint sensor 304, and the prospective biometric owner places a finger on the second fingerprint sensor 306, whether simultaneously or concurrently with the finger of the current biometric owner. The fingerprint associated with the current biometric owner is authenticated, and assuming authentication, fingerprint data associated with the prospective biometric owner is stored, and the prospective biometric owner is granted authentication or access rights. Success of the transaction may be indicated by the indicator 310.

Figure 4:
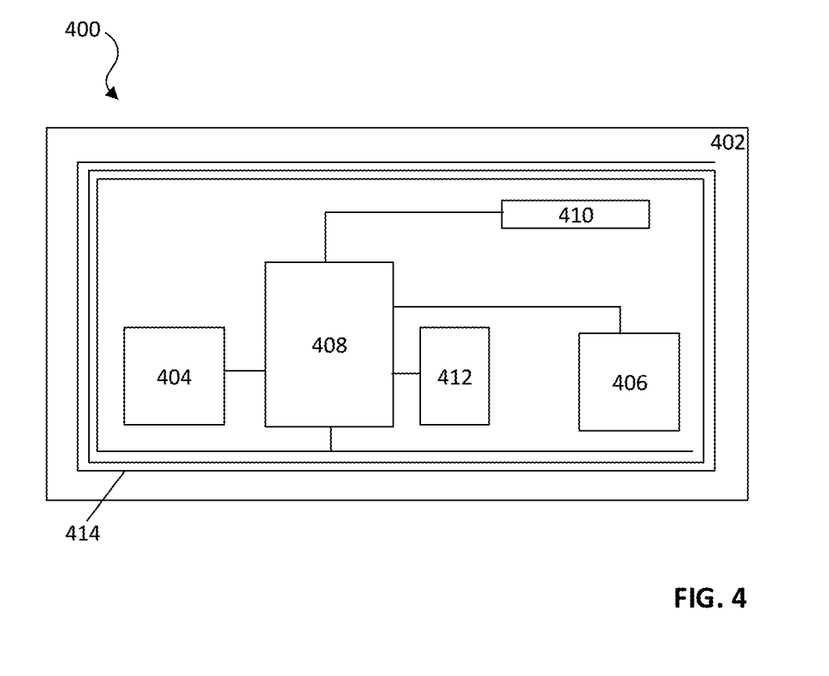
FIG. 4 depicts components of a credential authorization device, according to another aspect of the disclosure.

FIG. 4 depicts a credential authorization device 400 configured as a contactless smartcard, according to another aspect of the disclosure. In this manner, the contactless smartcard 400 may include a housing or substrate 402, a first fingerprint sensor 404, a second fingerprint sensor 406, one or more processors 408, an indicator 410, a memory 412, and an antenna 414, configured to inductively couple or capacitively couple with a reader device.

Figure 5:
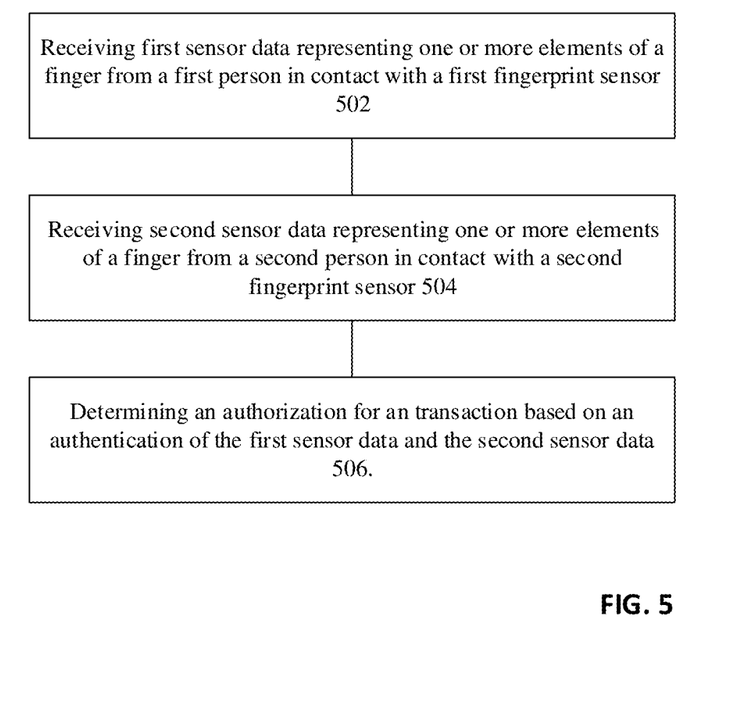
FIG. 5 depicts a method of credential transfer.

FIG. 5 depicts a method of credential authorization including receiving first sensor data representing one or more elements of a finger from a first person in contact with a first fingerprint sensor 502; receiving second sensor data representing one or more elements of a finger from a second person in contact with a second fingerprint sensor 504; and determining an authorization for a transaction based on an authentication of the first sensor data and the second sensor data 506.

Contactless smart cards may be powered through inductive or capacitive coupling with a reader device. This may be performed according to any known standard or method of inductive or capacitive coupling, without limitation. In this manner, a reader device and the credential authorization device are brought within close proximity to one another, to permit the inductive or capacitive coupling. The antenna 414 permits the inductive or capacitive coupling with the reader, and an electrical current is established within the antenna 414, said electrical current being used to power the one or more processors 408, the first fingerprint sensor 404, the second fingerprint sensor 406, the indicator 410, and/or the memory 412. As stated above, the current biometric owner places a finger on the first fingerprint sensor 404, the prospective biometric owner places a finger on the second fingerprint sensor 406, whether simultaneously or concurrently with the finger of the current biometric owner, and assuming authentication of the finger data corresponding to the current biometric owner in the first fingerprint sensor 404, data associated with the finger on the second fingerprint sensor 406 is authenticated and stored in a memory 412. Successful transfer of rights is indicated by the indicator 410. As stated herein, this entire process may be powered by inductive or capacitive coupling established with the antenna 414.

The indicator may be any device capable of indicating a successful transfer, without limitation. According to one aspect of the disclosure, the indicator may be configured to provide a visual indication of credential transfer. Such visual indicators may include, but are not limited to, a light, a display, or otherwise. That is, the indicator may illuminate to indicate successful or unsuccessful credential transfer. The indicator may additionally or alternatively display images, words, or otherwise to indicate successful or unsuccessful credential transfer. Alternatively or additionally, the indicator may be an audio indicator, configured to provide an audio indication of successful credential transfer. That is, the indicator may include a speaker or other device capable of producing an audio indicator, such as a tone, beep, recording playback, computer-generated speech, or otherwise. Alternatively or additionally, the indicator may be a haptic indicator, configured to provide a feeling or sensation to indicate successful credential transfer. That is, the indicator may include a haptic device capable of producing a vibration, pulse, or other tactile sensation.

The credential authorization device may be configured to be powered using one or more contacts, one or more antennas for inductive and/or capacitive coupling, and/or one or more batteries. In the event that one or more contacts are used for powering the elements of the credential authorization device, the one or more contacts may be placed to establish an electrical connection with a reader or other device capable of powering the credential authorization device. The remaining elements of the credential authorization device (sensors, indicator, or otherwise) may be arranged on or within the credential authorization device to permit physical access to these elements, as required, in light of the placement of the contacts.

In the event that the credential authorization device is configured to be powered using capacitive or inductive coupling, the corresponding antenna(s) may be placed on or inside the credential authorization device. The antenna(s) may be configured in accordance with ISO standards for inductive coupling for smartcards, or otherwise. The antenna(s) may be configured for any current or voltage specifications, without limitation. The antenna(s) may be configured to couple with a reader, which provides electrical power to the credential authorization device via the inductive or capacitive coupling. The reader may be a smart card reader, a smartphone, tablet computer, laptop, or any other device capable of inductively or capacitively powering the credential authorization device.

In the event that a reader device capable of wireless communication, such as but not limited to a smart phone, is used to inductively or capacitively power the credential authorization device, the credential authorization device may be configured to rely on data communication between the reader device and a third device, or the credential authorization device may be configured not to rely on such communication and in fact not to transfer data between the credential authorization device and the reader. For example, and assuming that the credential authorization device is configured to rely on data transfer between the reader and a third device, the credential authorization device may be configured to access data corresponding to a fingerprint of the current biometric owner, which may be stored remotely to the credential authorization device. In this manner, the authentication data corresponding to the current biometric owner may be stored on a server, in a cloud, or otherwise. The credential authorization device may couple with a reader, such as a smart phone, and transfer data from the first fingerprint sensor to the reader via the inductive or capacitive coupling. The reader then transfers the received data to a third device, such as the server or cloud, where the data is processed and analyzed. Upon authentication or rejection of the sensor data, a corresponding response is sent from the third device to the reader, which is then transferred from the reader to the credential authorization device. In this method, a local memory on the credential authorization device may be avoided.

On the other hand, and at least for security reasons, it may be desired to avoid data transfer between credential authorization device and any other device. In this manner, the reader may be used solely for powering the credential authorization device, but not for data transfer. Under this circumstance, the reader, whether a smart phone or otherwise, is used to inductively or capacitively couple to, and power, the credential authorization device, but all sensor reading and data processing is performed locally on the credential authorization device. That is, sensor data detected by the first sensor is compared to locally stored fingerprint data corresponding to the current biometric owner, and fingerprint data detected from the second sensor is authenticated and stored as having credentials associated with biometric ownership. According to this configuration, this procedure happens locally on the credential authorization device without relying on any data transfer between the device and the reader.

The fingerprint sensors may be configured for any kind of fingerprint data, without limitation. That is, the fingerprints may correspond to prints from any of the five digits on the hand, including the thumb. The fingerprint data may be collected by the sensor, processed, and/or stored according to any fingerprint analysis convention or technology, without limitation. That is, the fingerprint data may include a map or digital representation of one or more portions of fingerprint, one or more local markers or identifying elements of a fingerprint, a signature of fingerprint data, any algorithm corresponding to fingerprint data, a mathematical representation of any aspect of fingerprint data, or any other means of identifying or representing detected fingerprint data from a sensor.

According to an aspect of the disclosure, any of the implementations described herein may be alternatively configured with a single fingerprint sensor. According to this implementation, a single fingerprint sensor may be used to transfer credentials from a current biometric owner to a prospective biometric owner. In this manner, a transfer procedure may be initiated, and a fingerprint associated with the current biometric owner may be applied to the single fingerprint sensor. Upon verification of the fingerprint of the current biometric owner, a finger associated with the prospective biometric owner may subsequently be applied to the same fingerprint sensor, and fingerprint data associated with the prospective biometric owner may be authenticated and stored as being credentialed with biometric ownership.

The credential authorization device may be configured to replace or supplement credentials associated with the current biometric owner with credentials associated with the prospective biometric owner. That is, in carrying out any of the procedures described herein, and according to an aspect of the disclosure, the credentials associated with the prospective biometric owner may replace credentials associated with the current biometric owner. In this manner, Person A who is authenticated as a current biometric owner may transfer ownership rights to Person B, who is referred to as the prospective biometric owner. Upon completion of the transfer procedure, Person A may no longer have any valid credentials associated with the device, whereas Person B is now designated as the current biometric owner and may operate the device with Person B's own credentials.

According to a different aspect of the disclosure, the prospective biometric owner's credentials may supplement the credentials of the current biometric owner. According to this implementation, Person A, who is the current biometric owner, may authenticate additional credentialing of Person B, who is the prospective biometric owner. Upon completion of the current transfer procedure, both Person A and Person B have authenticated credentials and may operate the device independently.

The one or more processors may be configured to perform the procedures described herein by utilizing one or more computer readable instructions. These computer readable instructions may be according to any known computer language, without limitation. According to one aspect of the disclosure, the one or more processors may over operate according to one or more Javacard instructions.

The fingerprint sensors may be any kind of fingerprint sensors, without limitation. These may include, but are not limited to, an optical fingerprint sensor, configured to capture a digital image of the fingerprint; an ultrasonic fingerprint sensor, configured to obtain image data associated with the dermal skin layer; a capacitance sensor, configured to obtain fingerprint data based on electrical conductivity of the dermal layer and non-conductivity of the epidermal layer acting as a dielectric, or otherwise.

The credential authorization device may store credentials corresponding to second fingerprint data when first fingerprint data satisfied one or more authentication criteria. The authentication criteria may be any fingerprint authentication criterion or criteria, without limitation. Variously methods of modeling or representing fingerprints or fingerprint features are currently known, and any method of modeling or representing fingerprints or fingerprint features may be used, whether currently known or unknown. A non-exhaustive list of fingerprint modeling techniques that may be used include, but are not limited to, friction ridge pattern modeling, ridge orientation modeling, dot modeling, incipient ridge modeling, or otherwise.

According to an aspect of the disclosure, a smart card configured as a credential authorization device will permit transferable access rights from a person to another by forcing a donor's and receiver's simultaneous consensus via fingerprint authentication.

According to an aspect of the disclosure, fingerprint data may be stored only in the device, such as in the smart card.

According to another aspect of the disclosure, fingerprint data may be stored in a cloud storage medium.

According to an aspect of the disclosure root owner information may be pre-stored on the device during personalization, such as at the time of purchase, initialization, or initial credentialing.

The device may be powered via a local power supply, such as an internal battery. Alternatively, the device may be powered by connection to a contactless reader, such as via a Near Field Communication connection. The Near Field Communication connection may be achieved via a smartphone.

According to another aspect of the disclosure, the device may further including one or more solar cells, which are configured to convert light into electric current, and which are connected to the one or more processors and/or the one or more sensors to power the units of the device.

According to another aspect of the disclosure, the dual-sensor credentialing device and/or system described herein, or any corresponding method, may be configured as any one or more of a smartphone, a watch, a wearable device, a laptop, a tablet computer, or any other device into which credentialing is incorporated.

In the event that the dual-sensor credentialing device is configured as a smartphone, it is anticipated that the smartphone may include two fingerprint sensors, which are configured to operate in the manner described herein, such that a finger of the current biometric owner is placed on the first sensor, and a finger of a prospective biometric owner is placed on the second sensor, such that the prospective biometric owner becomes credentialed as a biometric owner.

In the event that the dual-sensor credentialing device is configured as a wearable device, it is further anticipated that the device may be configured with two sensors, such that a finger of the current biometric owner is placed on the first sensor, and a finger of a prospective biometric owner is placed on the second sensor, and thereby credentialing the prospective biometric owner as a biometric owner.

The dual-sensor credentialing device may be configured as an attachment for a smartphone, wearable device, tablet computer, laptop computer, or any other device described herein. For example, the device may include two fingerprint sensors to credential a prospective biometric owner in the manner described herein. The device may include an interface for connecting with the smartphone, wearable device, or other device. The interface may be any interface without limitation. A non-exhaustive list of potential interfaces includes Universal Serial Bus (USB), USB 1.x, USB 2.0, USB 3.x, or USB 4; Firewire; Thunderbolt 1; Thunderbolt 2; Thunderbolt 3, or otherwise. Depending on the desired configuration, an attachment as described in this paragraph may be equipped with its own logic, or it may rely on logic from the connected device, such as the smartphone, wearable, or otherwise.

The one or more processors may be configured to determine an authorization for a transaction based on an authentication of the first sensor data and the second sensor data. The authorization for the transaction may be for any transaction without limitation. A non-exhaustive list of such transactions includes, but is not limited to, authorizing a purchase, authorizing use of a smartcard, authorizing use of a credential authorization device, authorizing use of a key, authorizing use of a fob, authorizing the credentialing of the fingerprint of the second person, authorizing the credentialing of the fingerprint of the first person, authorizing the de-credentialing of the fingerprint of the first person, or any combination thereof.

As an extension of the implementations of authorization, above, it is noted that credential authorization device is not limited to transfer of credentials from one person to another, or even to the addition of a second set of credentials to the already-established set of first credentials. According to one aspect of the disclosure, both a first fingerprint profile and a second fingerprint profile may be stored on the card, both profiles being authorized for use of the device. The device may be configured to permit use of a smartcard or otherwise when a finger corresponding to the first fingerprint profile is applied to the sensor, when a finger corresponding to the second fingerprint profile is applied to the sensor, only when fingers corresponding to both the first fingerprint profile and the second fingerprint profile are applied to the sensor, or otherwise.

The following examples relate to additional aspects of the Disclosure:

In Example 1, a credential authorization device is disclosed including a first fingerprint sensor, configured to detect first sensor data representing one or more elements of a finger of a first person in contact with the first fingerprint sensor; a second fingerprint sensor, configured to detect second sensor data representing one or more elements of a finger of a second person in contact with the second fingerprint sensor; one or more processors, configured to receive the first sensor data and the second sensor data; compare the first sensor data to a stored first fingerprint profile of an authorized user, and if the comparison of the first sensor data to the stored first fingerprint profile of the authorized user satisfies one or more authentication criteria, generate a second fingerprint profile from the second sensor data; and designate the second fingerprint profile as corresponding to an authorized user.

In Example 2, the credential authorization device of Example 1 is disclosed, wherein the one or more processors are further configured to designate the second fingerprint profile as corresponding to the authorized user only if the finger of a first person is in contact with the first fingerprint sensor and the finger of a second person is simultaneously or concurrently in contact with the second fingerprint sensor.

In Example 3, the credential authorization device of Example 1 or 2 is disclosed, further including an indicator, and wherein the one or more processors are configured to control the indicator to change from a non-indicating mode to an indicating mode if the second fingerprint profile is designated as corresponding to an authorized user.

In Example 4, the credential authorization device of Example 3 is disclosed, wherein the indicator is a light, a display, a speaker, or any combination thereof.

In Example 5, the credential authorization device of Example 4 is disclosed, wherein controlling the indicator to change from a non-indicating mode to an indicating mode includes controlling the light to illuminate, the display to depict an image, the speaker to emit a sound, or any combination thereof.

In Example 6, the credential authorization device of any one of Examples 1 to 5 is disclosed, further including an antenna, configured to inductively or capacitively couple with a device.

In Example 7, the credential authorization device of Example 6 is disclosed, wherein the antenna is connected to the one or more processors, and wherein the one or more processors are powered by current received in the antenna from the inductive or capacitive coupling.

In Example 8, the credential authorization device of Example 6 or 7 is disclosed, wherein the antenna is a coil antenna.

In Example 9, the credential authorization device of any one of Examples 1 to 8 is disclosed, further including one or more memories, configured to store the first fingerprint profile.

In Example 10, the credential authorization device of Example 9 is disclosed, wherein the one or more processors are further configured to store the generated second fingerprint profile on the one or more memories.

In Example 11, the credential authorization device of claim 10 is disclosed, further including deleting the first fingerprint profile if the second fingerprint profile is stored in the one or more memories.

In Example 12, the credential authorization device of any one of Examples 1 to 11 is disclosed, wherein if the second fingerprint profile is designated as corresponding to an authorized user, the one or more processors are configured to delete the first fingerprint profile.

In Example 13, the credential authorization device of any one of Examples 1 to 11 is disclosed, wherein if the second fingerprint profile is designated as corresponding to an authorized user, the one or more processors are configured to store the first fingerprint profile and the second fingerprint profile as authorized users.

In Example 14, the credential authorization device of any one of Examples 1 to 13 is disclosed, wherein the first fingerprint profile is a binary data file representing one or more elements of a fingerprint.

In Example 15, the credential authorization device of any one of Examples 1 to 14 is disclosed, wherein the one or more processors are configured to generate the second fingerprint profile as a binary data file representing one or more elements of the second sensor data.

In Example 16, the credential authorization device of any one of Examples 1 to 15 is disclosed, wherein the credential authorization device is configured as a smart card.

In Example 17, the credential authorization device of any one of Examples 1 to 15 is disclosed, wherein the credential authorization device is configured as a key or key fob.

In Example 18, a smart card is disclosed including a first fingerprint sensor, configured to receive first sensor data representing one or more elements of a finger of a first person in contact with the first fingerprint sensor; a second fingerprint sensor, configured to receive second sensor data representing one or more elements of a finger of a second person in contact with the second fingerprint sensor; one or more processors, configured to receive the first sensor data and the second sensor data; compare the first sensor data to a stored first fingerprint profile of an authorized user, and if the comparison of the first sensor data to the stored first fingerprint profile of the authorized user satisfies one or more authentication criteria, generate a second fingerprint profile from the second sensor data; and designate the second fingerprint profile as corresponding to an authorized user.

In Example 19, the smart card of Example 18 is disclosed, wherein the one or more processors are further configured to designate the second fingerprint profile as corresponding to the authorized user only if the finger of a first person is in contact with the first fingerprint sensor and the finger of a second person is simultaneously or concurrently in contact with the second fingerprint sensor.

In Example 20, the smart card of Example 18 or 19 is disclosed, further including an indicator, and wherein the one or more processors are configured to control the indicator to change from a non-indicating mode to an indicating mode if the second fingerprint profile is designated as corresponding to an authorized user.

In Example 21, the smart card of Example 20 is disclosed, wherein the indicator is a light, a display, a speaker, or any combination thereof.

In Example 22, the smart card of Example 21 is disclosed, wherein controlling the indicator to change from a non-indicating mode to an indicating mode includes controlling the light to illuminate, the display to depict an image, the speaker to emit a sound, or any combination thereof.

In Example 23, the smart card of any one of Examples 18 to 22 is disclosed, further including an antenna, configured to inductively or capacitively couple with a device.

In Example 24, the smart card of Example 23 is disclosed, wherein the antenna is connected to the one or more processors, and wherein the one or more processors are powered by current received in the antenna from the inductive or capacitive coupling.

In Example 25, the smart card of Example 23 or 24 is disclosed, wherein the antenna is a coil antenna.

In Example 26, the smart card of any one of Examples 18 to 25 is disclosed, further including one or more memories, configured to store the first fingerprint profile.

In Example 27, the smart card of Example 26 is disclosed, wherein the one or more processors are further configured to store the generated second fingerprint profile on the one or more memories.

In Example 28, the smart card of claim 27 is disclosed, further including deleting the first fingerprint profile if the second fingerprint profile is stored in the one or more memories.

In Example 29, the smart card of any one of Examples 18 to 28 is disclosed, wherein if the second fingerprint profile is designated as corresponding to an authorized user, the one or more processors are configured to delete the first fingerprint profile.

In Example 30, the smart card of any one of Examples 18 to 29 is disclosed, wherein if the second fingerprint profile is designated as corresponding to an authorized user, the one or more processors are configured to store the first fingerprint profile and the second fingerprint profile as authorized users.

In Example 31, the smart card of any one of Examples 18 to 30 is disclosed, wherein the first fingerprint profile is a binary data file representing one or more elements of a fingerprint.

In Example 32, the smart card of any one of Examples 18 to 31 is disclosed, wherein the one or more processors are configured to generate the second fingerprint profile as a binary data file representing one or more elements of the second sensor data.

In Example 33, a method of credential authorization is disclosed including receiving first sensor data representing one or more elements of a finger of a first person in contact with a first fingerprint sensor; receiving second sensor data representing one or more elements of a finger of a second person in contact with a second fingerprint sensor; comparing the first sensor data to a stored first fingerprint profile of an authorized user, and if the comparison of the first sensor data to the stored first fingerprint profile of the authorized user satisfies one or more authentication criteria, generating a second fingerprint profile from the second sensor data and designating the second fingerprint profile as corresponding to an authorized user.

In Example 34, the method of credential authorization of Example 33 is disclosed, further including designating the second fingerprint profile as corresponding to the authorized user only if the finger of a first person is in contact with the first fingerprint sensor and the finger of a second person is simultaneously or concurrently in contact with the second fingerprint sensor.

In Example 35, the method of credential authorization of Example 32 or 34 is disclosed, further including controlling an indicator to change from a non-indicating mode to an indicating mode if the second fingerprint profile is designated as corresponding to an authorized user.

In Example 36, the method of credential authorization of Example 35 is disclosed, wherein the indicator is a light, a display, a speaker, or any combination thereof.

In Example 37, the method of credential authorization of Example 36 is disclosed, wherein controlling the indicator to change from a non-indicating mode to an indicating mode includes controlling the light to illuminate, the display to depict an image, the speaker to emit a sound, or any combination thereof.

In Example 38, the method of credential authorization of any one of Examples 33 to 37 is disclosed, further including storing the first fingerprint profile on one or more memories.

In Example 39, the method of credential authorization of Example 38 is disclosed, further including storing the generated second fingerprint profile on the one or more memories.

In Example 40, the method of credential authorization of claim 39 is disclosed, further including deleting the first fingerprint profile if the second fingerprint profile is stored in the one or more memories.

In Example 41, the method of credential authorization of any one of Examples 33 to 40 is disclosed, further including deleting the first fingerprint profile if the second fingerprint profile is designated as corresponding to an authorized user.

In Example 42, the method of credential authorization of any one of Examples 33 to 41 is disclosed, further including storing the first fingerprint profile and the second fingerprint profile as authorized users if the second fingerprint profile is designated as corresponding to an authorized user.

In Example 43, the method of credential authorization of any one of Examples 33 to 42 is disclosed, wherein the first fingerprint profile is a binary data file representing one or more elements of a fingerprint.

In Example 44, the method of credential authorization of any one of Examples 33 to 43 is disclosed, further including generating the second fingerprint profile as a binary data file representing one or more elements of the second sensor data.

In Example 45, the method of credential authorization of any one of Examples 33 to 44 is disclosed, wherein the method of credential authorization is performed by a smart card.

In Example 46, the method of credential authorization of any one of Examples 33 to 44 is disclosed, wherein the method of credential authorization is performed by a key or key fob.

In Example 47, one or more non-transient computer readable media are disclosed, including instructions to cause one or more processors to perform the method of any one of Examples 33 to 46.

In Example 48, the one or more non-transient computer readable media of Example 47 is disclosed, wherein the instructions are written in Javacard.

In Example 49, a credential authorization device is disclosed including a first fingerprint sensor, configured to detect first sensor data representing one or more elements of a finger of a first person in contact with the first fingerprint sensor; a second fingerprint sensor, configured to detect second sensor data representing one or more elements of a finger of a second person in contact with the second fingerprint sensor; and one or more processors, configured to determine an authorization for a transaction based on an authentication of the first sensor data and the second sensor data.

In Example 50, the credential authorization device of Example 49 is disclosed, further including a stored first fingerprint profile of an authorized user; wherein the one or more processors are further configured to compare the first sensor data to the stored first fingerprint profile, and if the comparison of the first sensor data to the stored first fingerprint profile satisfies one or more authorization criteria, to designate the second fingerprint profile as an authorized fingerprint profile.

In Example 51, the credential authorization device of Example 50 is disclosed, wherein, if the comparison of the first sensor data to the stored first fingerprint profile satisfies the one or more authentication criteria, the one or more processors are further configured to generate the second fingerprint profile from the second sensor data.

In Example 52, the credential authorization device of any one of Examples 49 to 51 is disclosed, wherein the one or more processors are further configured to designate the second fingerprint profile as corresponding to the authorized user only if the finger of the first person is in contact with the first fingerprint sensor and the finger of the second person is simultaneously or concurrently in contact with the second fingerprint sensor.

In Example 53, the credential authorization device of any one of Examples 49 to 52 is disclosed, further including an indicator, and wherein the one or more processors are configured to control the indicator to change from a non-indicating mode to an indicating mode if the second fingerprint profile is designated as corresponding to an authorized user.

In Example 54, the credential authorization device of Example 53 is disclosed, wherein the indicator is a light, a display, a speaker, or any combination thereof.

In Example 55, the credential authorization device of Example 54 is disclosed, wherein controlling the indicator to change from a non-indicating mode to an indicating mode includes controlling the light to illuminate, the display to depict an image, the speaker to emit a sound, or any combination thereof.

In Example 56, the credential authorization device of any one of Examples 49 to 55 is disclosed, further including an antenna, configured to inductively or capacitively couple with a device.

In Example 57, the credential authorization device of Example 56 is disclosed, wherein the antenna is connected to the one or more processors, and wherein the one or more processors are powered by current received in the antenna from the inductive or capacitive coupling.

In Example 58, the credential authorization device of Example 56 or 57 is disclosed, wherein the antenna is a coil antenna.

In Example 59, the credential authorization device of any one of Examples 49 to 58 is disclosed, further including one or more memories, configured to store the first fingerprint profile.

In Example 60, the credential authorization device of Example 59 is disclosed, wherein the one or more processors are further configured to store the generated second fingerprint profile on the one or more memories.

In Example 61, the credential authorization device of claim 60 is disclosed, further including deleting the first fingerprint profile if the second fingerprint profile is stored in the one or more memories.

In Example 62, the credential authorization device of any one of Examples 49 to 61 is disclosed, wherein if the second fingerprint profile is designated as corresponding to an authorized user, the one or more processors are configured to delete the first fingerprint profile.

In Example 63, the credential authorization device of any one of Examples 49 to 62 is disclosed, wherein if the second fingerprint profile is designated as corresponding to an authorized user, the one or more processors are configured to store the first fingerprint profile and the second fingerprint profile as authorized users.

In Example 64, the credential authorization device of any one of Examples 49 to 63 is disclosed, wherein the first fingerprint profile is a binary data file representing one or more elements of a fingerprint.

In Example 65, the credential authorization device of any one of Examples 49 to 65 is disclosed, wherein the one or more processors are configured to generate the second fingerprint profile as a binary data file representing one or more elements of the second sensor data.

In Example 66, the credential authorization device of any one of Examples 49 to 65 is disclosed, wherein the credential authorization device is configured as a smart card.

In Example 67, the credential authorization device of any one of Examples 49 to 66 is disclosed, wherein the credential authorization device is configured as a key or key fob.

In Example 68, a smart card is disclosed including a first fingerprint sensor, configured to receive first sensor data representing one or more elements of a finger of a first person in contact with the first fingerprint sensor; a second fingerprint sensor, configured to receive second sensor data representing one or more elements of a finger of a second person in contact with the second fingerprint sensor; and one or more processors, configured to determine an authorization for a transaction based on an authentication of the first sensor data and the second sensor data.

In Example 69, the smart card of Example 68 further including a stored first fingerprint profile of an authorized user; wherein the one or more processors are further configured to compare the first sensor data to the stored first fingerprint profile, and if the comparison of the first sensor data to the stored first fingerprint profile satisfies one or more authorization criteria, to designate the second fingerprint profile as an authorized fingerprint profile.

In Example 70, the smart card of Example 69, wherein, if the comparison of the first sensor data to the stored first fingerprint profile satisfies the one or more authentication criteria, the one or more processors are further configured to generate the second fingerprint profile from the second sensor data.

In Example 71, the smart card of Example 70 is disclosed, wherein the one or more processors are further configured to designate the second fingerprint profile as corresponding to the authorized user only if the finger of the first person is in contact with the first fingerprint sensor and the finger of the second person is simultaneously or concurrently in contact with the second fingerprint sensor.

In Example 72, the smart card of any one of Examples 68 to 71 is disclosed, further including an indicator, and wherein the one or more processors are configured to control the indicator to change from a non-indicating mode to an indicating mode if the second fingerprint profile is designated as corresponding to an authorized user.

In Example 73, the smart card of Example 72 is disclosed, wherein the indicator is a light, a display, a speaker, or any combination thereof.

In Example 74, the smart card of Example 73 is disclosed, wherein controlling the indicator to change from a non-indicating mode to an indicating mode includes controlling the light to illuminate, the display to depict an image, the speaker to emit a sound, or any combination thereof.

In Example 75, the smart card of any one of Examples 68 to 74 is disclosed, further including an antenna, configured to inductively or capacitively couple with a device.

In Example 76, the smart card of Example 23 is disclosed, wherein the antenna is connected to the one or more processors, and wherein the one or more processors are powered by current received in the antenna from the inductive or capacitive coupling.

In Example 77, the smart card of Example 75 or 76 is disclosed, wherein the antenna is a coil antenna.

In Example 78, the smart card of any one of Examples 68 to 77 is disclosed, further including one or more memories, configured to store the first fingerprint profile.

In Example 79, the smart card of Example 78 is disclosed, wherein the one or more processors are further configured to store the generated second fingerprint profile on the one or more memories.

In Example 80, the smart card of claim 79 is disclosed, further including deleting the first fingerprint profile if the second fingerprint profile is stored in the one or more memories.

In Example 81, the smart card of any one of Examples 68 to 80 is disclosed, wherein if the second fingerprint profile is designated as corresponding to an authorized user, the one or more processors are configured to delete the first fingerprint profile.

In Example 82, the smart card of any one of Examples 68 to 81 is disclosed, wherein if the second fingerprint profile is designated as corresponding to an authorized user, the one or more processors are configured to store the first fingerprint profile and the second fingerprint profile as authorized users.

In Example 83, the smart card of any one of Examples 68 to 82 is disclosed, wherein the first fingerprint profile is a binary data file representing one or more elements of a fingerprint.

In Example 84, the smart card of any one of Examples 68 to 83 is disclosed, wherein the one or more processors are configured to generate the second fingerprint profile as a binary data file representing one or more elements of the second sensor data.

In Example 85, a method of credential authorization is disclosed including receiving first sensor data representing one or more elements of a finger of a first person in contact with a first fingerprint sensor; receiving second sensor data representing one or more elements of a finger of the second person in contact with a second fingerprint sensor; and determining an authorization for a transaction based on an authentication of the first sensor data and the second sensor data.

In Example 86, the method of credential authorization of Example 85 further including a stored first fingerprint profile of an authorized user; wherein the one or more processors are further configured to compare the first sensor data to the stored first fingerprint profile, and if the comparison of the first sensor data to the stored first fingerprint profile satisfies one or more authorization criteria, to designate the second fingerprint profile as an authorized fingerprint profile.

In Example 87, a method of credential authorization of Example 85 or 86, wherein, if the comparison of the first sensor data to the stored first fingerprint profile satisfies the one or more authentication criteria, the one or more processors are further configured to generate the second fingerprint profile from the second sensor data.

In Example 88, the method of credential authorization of any one of Examples 85 to 87 is disclosed, further including designating the second fingerprint profile as corresponding to the authorized user only if the finger of the first person is in contact with the first fingerprint sensor and the finger of the second person is simultaneously or concurrently in contact with the second fingerprint sensor.

In Example 89, the method of credential authorization of any one of Examples 85 to 88 is disclosed, further including controlling an indicator to change from a non-indicating mode to an indicating mode if the second fingerprint profile is designated as corresponding to an authorized user.

In Example 90, the method of credential authorization of Example 89 is disclosed, wherein the indicator is a light, a display, a speaker, or any combination thereof.

In Example 91, the method of credential authorization of Example 90 is disclosed, wherein controlling the indicator to change from a non-indicating mode to an indicating mode includes controlling the light to illuminate, the display to depict an image, the speaker to emit a sound, or any combination thereof.

In Example 92, the method of credential authorization of any one of Examples 85 to 91 is disclosed, further including storing the first fingerprint profile on one or more memories.

In Example 93, the method of credential authorization of Example 92 is disclosed, further including storing the generated second fingerprint profile on the one or more memories.

In Example 94, the method of credential authorization of claim 93 is disclosed, further including deleting the first fingerprint profile if the second fingerprint profile is stored in the one or more memories.

In Example 95, the method of credential authorization of any one of Examples 85 to 94 is disclosed, further including deleting the first fingerprint profile if the second fingerprint profile is designated as corresponding to an authorized user.

In Example 96, the method of credential authorization of any one of Examples 85 to 95 is disclosed, further including storing the first fingerprint profile and the second fingerprint profile as authorized users if the second fingerprint profile is designated as corresponding to an authorized user.

In Example 97, the method of credential authorization of any one of Examples 85 to 96 is disclosed, wherein the first fingerprint profile is a binary data file representing one or more elements of a fingerprint.

In Example 98, the method of credential authorization of any one of Examples 85 to 97 is disclosed, further including generating the second fingerprint profile as a binary data file representing one or more elements of the second sensor data.

In Example 99, the method of credential authorization of any one of Examples 85 to 98 is disclosed, wherein the method of credential authorization is performed by a smart card.

In Example 100, the method of credential authorization of any one of Examples 85 to 99 is disclosed, wherein the method of credential authorization is performed by a key or key fob.

In Example 101, one or more non-transient computer readable media are disclosed, including instructions to cause one or more processors to perform the method of any one of Examples 85 to 100.

In Example 102, the one or more non-transient computer readable media of Example 101 is disclosed, wherein the instructions are written in Javacard.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

The invention claimed is:

1. A credential authorization device, comprising:
   a first fingerprint sensor configured to sense first fingerprint data of a current authorized user in contact with the first fingerprint sensor, wherein the current authorized user is permitted to authorize a transaction;
   a second fingerprint sensor configured to sense second fingerprint data of a prospective authorized user in contact with the second fingerprint sensor, wherein the sensing by the second fingerprint sensor is simultaneous or concurrent with the sensing by the first fingerprint sensor; and
   one or more processors configured to:
      compare the sensed first fingerprint data with stored first fingerprint data, to verify that the sensed first fingerprint data corresponds with the current authorized user; and
      upon verification of the current authorized user, store the sensed second fingerprint data corresponding with the prospective authorized user, and replace credentials of the current authorized user with credentials of the prospective authorized user, to replace the current authorized user with the prospective authorized user as the current authorized user permitted to authorize the transaction.

2. The credential authorization device of claim 1, further comprising:
   an indicator, wherein the one or more processors are configured to control the indicator to change from a non-indicating mode to an indicating mode if the prospective authorized user replaces the current authorized user.

3. The credential authorization device of claim 2, wherein the indicator is configured to indicate the change from the non-indicating mode to the indicating mode with an audio indication, a visual indication, and/or a haptic feedback.

4. The credential authorization device of claim 1, further comprising:
   an antenna configured to inductively or capacitively couple with another device, wherein the antenna is connected to the one or more processors, and the one or more processors are powered by current received in the antenna from the inductive or capacitive coupling.

5. The credential authorization device of claim 1, wherein if the prospective authorized user is made the current authorized user, the one or more processors are configured to delete the stored first fingerprint data.

6. The credential authorization device of claim 1, wherein the credential authorization device is configured as a key, a key fob, a smartphone, or a wearable device.

7. The credential authorization device of claim 1, wherein the stored first fingerprint data corresponds with a stored first fingerprint profile, the sensed first fingerprint data corresponds with a sensed first fingerprint profile, and the sensed second fingerprint data corresponds with a sensed second fingerprint profile.

8. The credential authorization device of claim 7, wherein upon verification of the current authorized user, the one or more processors are further configured to generate a second fingerprint profile based on the sensed second fingerprint data.

9. A smart card, comprising:
   a first fingerprint sensor configured to sense first fingerprint data of a current authorized user in contact with the first fingerprint sensor, wherein the current authorized user is permitted to authorize a transaction;
   a second fingerprint sensor configured to sense second fingerprint data of a prospective authorized user in contact with the second fingerprint sensor, wherein the sensing by the second fingerprint sensor is simultaneous or concurrent with the sensing by the first fingerprint sensor; and
   one or more processors configured to:
      compare the sensed first fingerprint data with stored first fingerprint data, to verify that the sensed first fingerprint data corresponds with the current authorized user; and
      upon verification of the current authorized user, store the sensed second fingerprint data corresponding with the prospective authorized user, and replace credentials of the current authorized user with credentials of the prospective authorized user, to replace the current authorized user with the prospective authorized user as the current authorized user permitted to authorize the transaction.

10. The smart card of claim 9, further comprising:
an indicator, wherein the one or more processors are configured to control the indicator to change from a non-indicating mode to an indicating mode if the prospective authorized user replaces the current authorized user.

11. The smart card of claim 10, wherein the indicator is configured to indicate the change from the non-indicating mode to the indicating mode with an audio indication, a visual indication, and/or a haptic feedback.

12. The smart card of claim 9, further comprising:
an antenna configured to inductively or capacitively couple with another device, wherein the antenna is connected to the one or more processors, and the one or more processors are powered by current received in the antenna from the inductive or capacitive coupling.

13. The smart card of claim 9, wherein if the prospective authorized user is made the current authorized user, the one or more processors are configured to delete the stored first fingerprint data.

14. The smart card of claim 9, wherein the smart card is configured as a key, a key fob, a smartphone, or a wearable device.

15. The smart card of claim 9, wherein the stored first fingerprint data corresponds with a stored first fingerprint profile, the sensed first fingerprint data corresponds with a sensed first fingerprint profile, and the sensed second fingerprint data corresponds with a sensed second fingerprint profile.

16. The smart card of claim 15, wherein upon verification of the current authorized user, the one or more processors are further configured to generate a second fingerprint profile based on the sensed second fingerprint data.

17. A method of credential authorization, comprising:
a first fingerprint sensor sensing first fingerprint data of a current authorized user in contact with the first fingerprint sensor, wherein the current authorized user is permitted to authorize a transaction;
a second fingerprint sensor sensing second fingerprint data of a prospective authorized user in contact with the second fingerprint sensor, wherein the sensing by the second fingerprint sensor is simultaneous or concurrent with the sensing by the first fingerprint sensor;
one or more processors comparing the sensed first fingerprint data with stored first fingerprint data, to verify that the sensed first fingerprint data corresponds to the current authorized user; and
upon verification of the current authorized user, the one or more processors storing the sensed second fingerprint data corresponding with the prospective authorized user, and replacing credentials of the current authorized user with credentials of the prospective authorized user, to replace the current authorized user with the prospective authorized user as the current authorized user permitted to authorize the transaction.

18. The method of credential authorization of claim 17, wherein:
the stored first fingerprint data corresponds with a stored first fingerprint profile, the sensed first fingerprint data corresponds with a sensed first fingerprint profile, and the sensed second fingerprint data corresponds with a sensed second fingerprint profile, and
the method further comprises, upon verification of the current authorized user, the one or more processors generating a second fingerprint profile from the sensed second fingerprint data.

19. One or more non-transient computer readable media comprising instructions to cause one or more processors to perform a method of credential authorization, comprising:
a first fingerprint sensor sensing first fingerprint data of a current authorized user in contact with the first fingerprint sensor, wherein the current authorized user is permitted to authorize a transaction;
a second fingerprint sensor sensing second fingerprint data of a prospective authorized user in contact with the second fingerprint sensor, wherein the sensing by the second fingerprint sensor is simultaneous or concurrent with the sensing by the first fingerprint sensor;
one or more processors comparing the sensed first fingerprint data with stored first fingerprint data, to verify that the sensed first fingerprint data corresponds to the current authorized user; and
upon verification of the current authorized user, the one or more processors storing the sensed second fingerprint data corresponding with the prospective authorized user, and replacing credentials of the current authorized user with credentials of the prospective authorized user, to replace the current authorized user with the prospective authorized user as the current authorized user permitted to authorize the transaction.

* * * * *